United States Patent

Yamanaka et al.

[11] Patent Number: 5,757,577
[45] Date of Patent: May 26, 1998

[54] MAGNETIC RECORDING-PLAYBACK APPARATUS FOR CASSETTES OF TWO DIFFERENT SIZES

[75] Inventors: Kenji Yamanaka, Daito; Masahiro Moriyama, Osaka; Toshihide Hamaguchi, Higashiosaka; Hiroshi Nakashima, Hirakata, all of Japan

[73] Assignee: Sanyo Electric Co., Ltd., Osaka, Japan

[21] Appl. No.: 751,479

[22] Filed: Nov. 18, 1996

[30] Foreign Application Priority Data

Nov. 17, 1995 [JP] Japan ................... 7-300223
May 17, 1996 [JP] Japan ................... 8-123482
Dec. 15, 1996 [JP] Japan ................... 7-327555

[51] Int. Cl.⁶ ........................ G11B 15/675; G11B 15/66
[52] U.S. Cl. ........................ 360/94
[58] Field of Search ................ 360/94; 242/347.1

[56] References Cited

U.S. PATENT DOCUMENTS

| | | | |
|---|---|---|---|
| 5,121,271 | 6/1992 | Sakumoto et al. | 360/94 |
| 5,390,056 | 2/1995 | Kawada | 360/94 |
| 5,568,339 | 10/1996 | Ando et al. | 360/94 |

FOREIGN PATENT DOCUMENTS

| | | |
|---|---|---|
| 0 311 390 A2 | 4/1989 | European Pat. Off. . |
| 0 435 267 A2 | 7/1991 | European Pat. Off. . |
| 0 476 145 A1 | 3/1992 | European Pat. Off. . |
| 0 571 150 A2 | 11/1993 | European Pat. Off. . |
| 02123550 | 5/1990 | Japan . |
| 2-123550 | 5/1990 | Japan . |
| 03076045 | 4/1991 | Japan . |
| 3-76045 | 4/1991 | Japan . |

*Primary Examiner*—Robert S. Tupper
*Attorney, Agent, or Firm*—Armstrong, Westerman, Hattori, McLeland & Naughton

[57] ABSTRACT

A composite tray comprises a small cassette tray and a large cassette tray pivoted to inside portions of the tray. A first lid opener for opening the lid of a large cassette is pivoted to inside portions of the large cassette tray. Pivoted to the opener is a second lid opener pivotally movable in a plane parallel to the bottom surface of the large cassette for opening the lid of a small cassette. The second lid opener is positioned in a large cassette supporting region in the absence of the large cassette, but is pushed by the lid of the large cassette to escape to the outside of the tray when the cassette is placed on the tray.

5 Claims, 14 Drawing Sheets

MAGNETIC RECORDING-PLAYBACK APPARATUS FOR CASSETTES OF TWO DIFFERENT SIZES

FIELD OF THE INVENTION

The present invention relates to magnetic recording-playback apparatus adapted for selective use with either one of two kinds of VTR cassettes which are different in size, and more particularly to digital VTRs.

BACKGROUND OF THE INVENTION

VTR cassettes for use in recording and reproducing signals by the same method are proposed in two different sizes in recent years as shown in the side elevations of FIGS. 22, (a) and (b). The illustrated large and small cassettes 1, 2 each have a lid 10 pivoted to the front end of the cassette for protecting a tape accommodated therein. While each of the cassettes 1, 2 is being loaded in position, the lid 10 is opened, and the tape is withdrawn by leading guides (not shown) for recording or playback. The cassette 1 or 2 is provided on a side wall thereof with a lock piece 20 projectable from and retractable into the side wall for preventing the lid 10 from rotating inadvertently. The lock piece 20 is in engagement with a projection 12 provided on the inner surface of the lid 10. The lid 10 is unlocked and can be opened when the lock piece 20 is pushed inward.

With reference to FIG. 23, an unlocking piece 25 is retractably provided on a side wall of a tray 3 for releasing the projection 12 of the lid 10 from the lock piece 20 for unlocking. When the cassette 1 or 2 is placed on the tray 3, the unlocking piece 25 pushes the lock piece 20 to unlock the lid 10.

FIGS. 19 to 21 show a magnetic recording-playback apparatus which is already known and into which either one of two kinds of VTR cassettes in different sizes is loadable selectively (see JP-A-123550/1990).

The apparatus is adapted for use with cassettes of the VHS standard and has a lid opener 500 which is held retracted from the path of movement of the small cassette 2. When the small cassette 2 is loaded, the opener 500 for opening the lid 10 of the cassette 2 is advanced into the path of movement of the cassette 2. FIGS. 19 and 21 are side elevations of a cassette loading device, and FIG. 20 is a perspective view showing part of the upper side of the device. A tray 3 for supporting either one of the two kinds of cassettes is horizontally movably provided between a pair of side plates 80, 80. Two plate members 510, 520 are connected between the upper ends of the side plates 80, 80.

The tray 3 has at its center a recess 38 for fitting the small cassette 2 therein. As indicated in a dot-and-dash line in FIG. 19, the large cassette 1 is placed on the upper wall of the tray 3. The tray 3 is transported first horizontally from outside the apparatus and then lowered to a cassette loading position. The tray 3 has a side wall (not shown) adapted to come into contact with the large cassette 1 and provided with the aforementioned unlocking piece for unlocking the lid 10 of the large cassette 1.

A top plate 530 is laid on the plate members 510, 520 across a space therebetween. Disposed under the plate member 510 is a pivotal member 540 having a base end pivoted to the side plates 80 inside thereof. The pivotal member 540, which is made of an elastic material, is pressed against the upper wall of the large cassette 1 as loaded in position and is drivingly rotated by a cam (not shown) attached to the outer side of the side plate 80. Pivotal arms 560, 560 each having a free end resting on the pivotal member 540 are pivoted, each at a base end thereof, to a support frame 550 mounted on the plate member 510. As shown in FIG. 20, a lug 570 projecting from a free end portion of one of the pivotal arms 560 has a shaft 580 extending therefrom along the direction of sliding movement of the tray 3. Pivotably supported by the shaft 580 is the lid opener 500, which is provided with a contact piece 590 for opening the lid 10 of the cassette. The lid opener 500 is pivotally movable about the shaft 580 in a vertical plane orthogonal to the sliding direction of the tray 3. The lid opener 500 is so biased by a torsion spring 595 that a pin 500a provided on the shaft 580 at one side thereof opposite to the contact piece 590 is in contact with the rear surface of the top plate 530.

The large cassette 1 has a greater width than the small cassette 2. When the large cassette 1 is inserted between the side plates 80, 80, the side walls of the cassette 1 are positioned close to the respective side plates 80. When the tray 3 has been horizontally transported, the pivotal member 540 remains in a horizontal position as seen in FIG. 19.

The lid 10 of the large cassette 1 as placed on the tray 3 is opened by bringing the lower end of the lid 10 into contact with a projection 88, indicated in a broken line in FIG. 19, on the inner side of the side plate 80 with the descent of the tray 3. The lid 10 of the large cassette 1 is unlocked by the unlocking piece (not shown) provided on a side portion of the tray 3 as previously stated.

The lid 10 of the small cassette 2 as placed in the tray 3 can not be opened by bringing the lid 10 into contact with the projection 88 on the inner side of the side plate 80 unlike the large cassette 1 for the following reason. Since the side wall of the large cassette 1 is positioned close to the side plate 80 as already described, the lid 10 of the large cassette 1 can be brought into contact with the projection 88, whereas the side wall of the small cassette 2 is away from the side plate 80, so that if the projection 88 is adapted for contact with the lid 10 of the small cassette 2, the large cassette 1 becomes no longer loadable. The lid 10 of the small cassette 2 is therefore opened in the following manner.

When the small cassette 2 as transported horizontally starts to descend, the pivotal member 540 and the pivotal arms 560 are pivotally moved downward by the cam with the descent of the tray 3 as shown in FIG. 21. With the downward movement of the pivotal arm 560 having the lid opener 500 pivoted thereto, the pin 500a of the lid opener 500 shown in FIG. 20 moves out of contact with the top plate 530. The torsion spring 595 pivotally moves the lid opener 500 downward into contact with the lower end of the lid 10 of the small cassette 2 as seen in FIG. 21. The lid 10 opens with the descent of the tray 3. The pivotal arm 560 is thus moved down with the descent of the tray 3 because if the tray 3 is transported with the arm 560 moved down, the small cassette 2 would collide with the pivotal arms 560.

The lid 10 of the small cassette 2 is unlocked by an unlocking mechanism provided on the lid opener 500, but the mechanism will not be described in detail.

The conventional cassette loading device has the following problems to be solved.

1. The device shown in FIGS. 19 to 21 requires a mechanism for pivotally moving the arms 560 and the lid opener 500 as timed with the loading and unloading of the small cassette 2 to result in an increase in the number of components. The mechanism for opening the lid 10 of the small cassette 2 is disposed above the path of movement of the cassette 2 and therefore gives an increased height to the cassette loading device. Furthermore, the assembling the components of such a mechanism will involve an error that is likely to make the lid opening-closing movement unstable.

2. Digital VTRs have been proposed in recent years for recording images and sound by a digital system to ensure improvements in the quality of reproduced images.

With reference to FIG. 24, the cassettes for the digital VTR, i.e., both large and small cassettes 1, 2, comprise a first lid 10 pivoted to the side walls of the cassette at 14, and a second lid 11 having a base end pivoted to the first rid 10 at 15 and slidable along a guide groove 13 formed in each of the cassette side walls. A lock piece 20 is pivoted to the cassette side wall at 21 and biased by a spring counterclockwise into engagement with the first lid 10. When to be disengaged from the first lid 10, the lock piece 20 must be moved clockwise about the pivot 21 against the force of the spring. In this respect, the cassettes differ from those of the VHS standard wherein the lid 10 is unlocked by pushing the lock piece 20 inward.

In this case, it appears possible to disengage the lock piece 20 from the first lid 10 by providing a projecting piece 31 having a slope 32 on the bottom wall of a tray 3 and causing the lower end of the lock piece 20 to come into contact with the slope 31 of the projecting piece 31 when the cassette 3 is placed into the tray 3. However, the repeated experiments conducted by the present applicant have revealed that if the cassette for the digital VTR is placed into the tray 3 with the front end of the cassette slightly tilted downward, the lock piece 20 can not be completely disengaged from the first lid 10 whatever alterations may be made in the slope 32 or in the height of the projecting piece 31. When the device shown in FIG. 19 is used in the digital VTR, the large cassette 1 can be inserted from behind obliquely, whereas if the small cassette 2 is placed into the tray 3 immediately from above the recess 38 with the cassette front end tilted downward because the small cassette 2 is insertable only immediately from above the recess 38, it is very likely that the lock piece 20 will not be disengaged from the first lid 10.

These problems have led the applicant to conceive the idea of providing a slide member for rotating the lock piece 20 by contact therewith in order to ensure the disengagement of the lock piece 20 from the first lid 10 of the small cassette 2 for use in digital VTRs.

SUMMARY OF THE INVENTION

An object of the present invention is to provide a simplified mechanism for opening the first lids 10 of large and small cassette 1, 2.

Another object of the invention is to reliably disengage the lock piece 20 from the first lid 10.

The present invention provides a magnetic recording-playback apparatus which comprises a first lid opener 6 for opening the lid 10 of a large cassette 1, and a second lid opener 7 pivoted to the first lid opener 6 for opening the lid 10 of a small cassette 2, the second lid opener 7 being pivotally movable in a plane parallel to the bottom surface of the large cassette 1. With the large cassette 1 supported on a large cassette tray 4, the lid 10 of the large cassette 1 pushes a kickout piece 71 of the second lid opener 7, moving out the second lid opener 7 from the large cassette supporting position.

The lid 10 of the large cassette 1 is opened and closed independently of the second lid opener 7. The lid 10 of the large cassette 1 is opened by the first opener 6, and the lid 10 of the small cassette 2 by the second lid opener 7.

Accordingly, the lids 10 of the large and small cassettes 1, 2 can be opened safely by a mechanism simpler than in the prior art.

The second lid opener 7 is rotatable in a plane parallel to the bottom surface of the large cassette 1 and therefore need not be retracted to above the path of movement of the cassette unlike the conventional lid opener 500. This makes the cassette loading mechanism smaller than the conventional one in height.

When the small cassette 2 is loaded as placed on the small cassette tray 5, an unlocking slide 9 is disengaged from a connecting bar 82, whereupon the slide 9 slidingly moves toward a direction to unlock a lock piece 20 and disengages the lock piece 20 from the lid 10.

Accordingly, the lid 10 of the small cassette 2 is reliably unlocked in whatever posture the small cassette 2 may be placed on the large cassette tray 4.

DETAILED DESCRIPTION OF THE PREFERRED EMBODIMENT

An embodiment of the invention will be described below with reference to the drawings concerned. The terms "front" and "rear" will be used with respect to the direction of travel of a composite tray 3 for selectively placing thereon either one of large and small cassettes 1 and 2.

Figure 24:
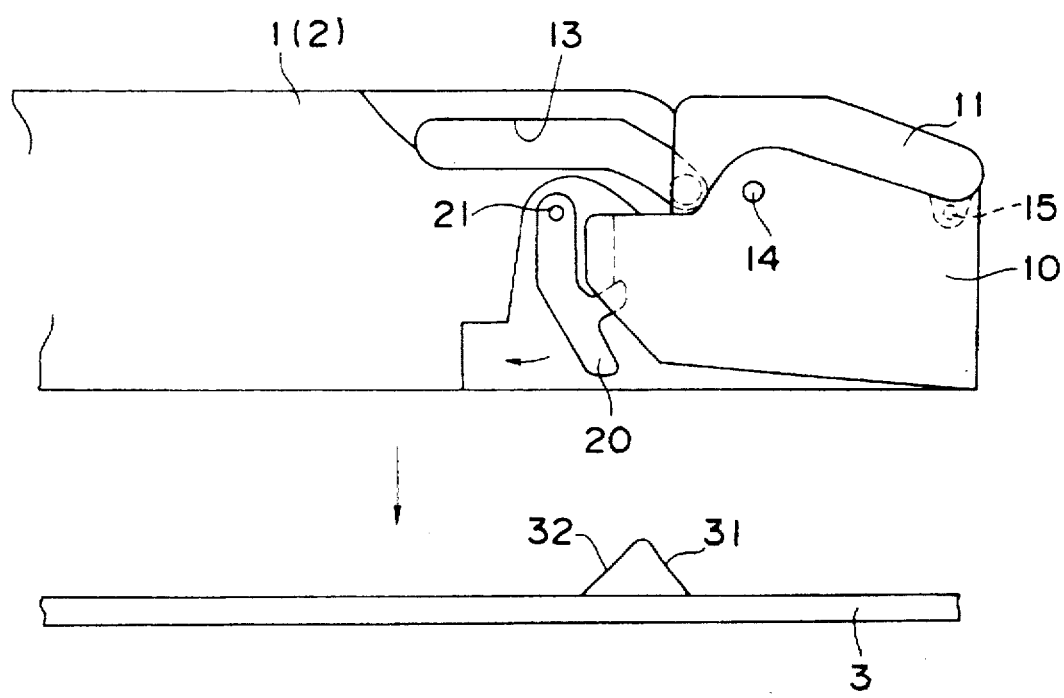
FIG. 24 is a side elevation of a cassette lock mechanism included in a digital VTR.

The magnetic recording-playback apparatus embodying the invention is a digital VTR, and is loadable with either one of cassettes in two different sizes, i.e., large and small cassettes 1, 2 selectively for the digital VTR. The cassettes 1, 2 are different in width and front-to-rear length but are in common in having pivoted first lid 10 and second lid 11 (see FIG. 24).

[Brief Description of the Apparatus] (see FIGS. 1–5)

Generally stated, the magnetic recording-playback apparatus has the following construction. The composite tray 3 comprises a small cassette tray 5 and a large cassette tray 4 pivoted to inside portions of the tray 5. A first lid opener 6 for opening the first lid 10 of the large cassette 1 is pivoted to inside portions of the large cassette tray 4. Pivotably supported by the first lid opener 6 is a second lid opener 7 adapted to open the first lid 10 of the small cassette 2 and pivotally movable in a plane parallel to the bottom surface of the large cassette 1. When the large cassette 1 is supported on the tray 4, the second lid opener 7 is forced out from the cassette supporting position, rendering the first lid 10 of the large cassette 1 openable free of interference.

Figure 15:
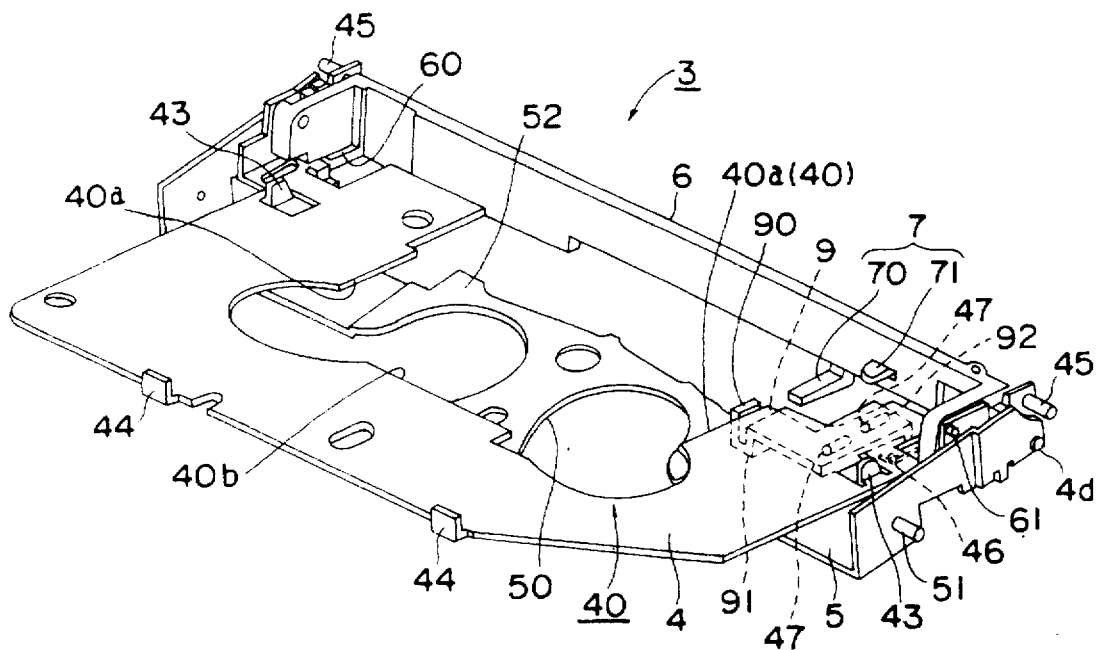
FIG. 15 is a perspective view of a composite tray provided with an unlocking slide.

An unlocking slide 9 for unlocking the first lid 10 of the small cassette 2 is slidably provided beneath the rear surface of the large cassette tray 4 (see FIG. 15). These mechanisms will be described below in greater detail.

[Detailed Description of the Mechanisms]

Figure 1:
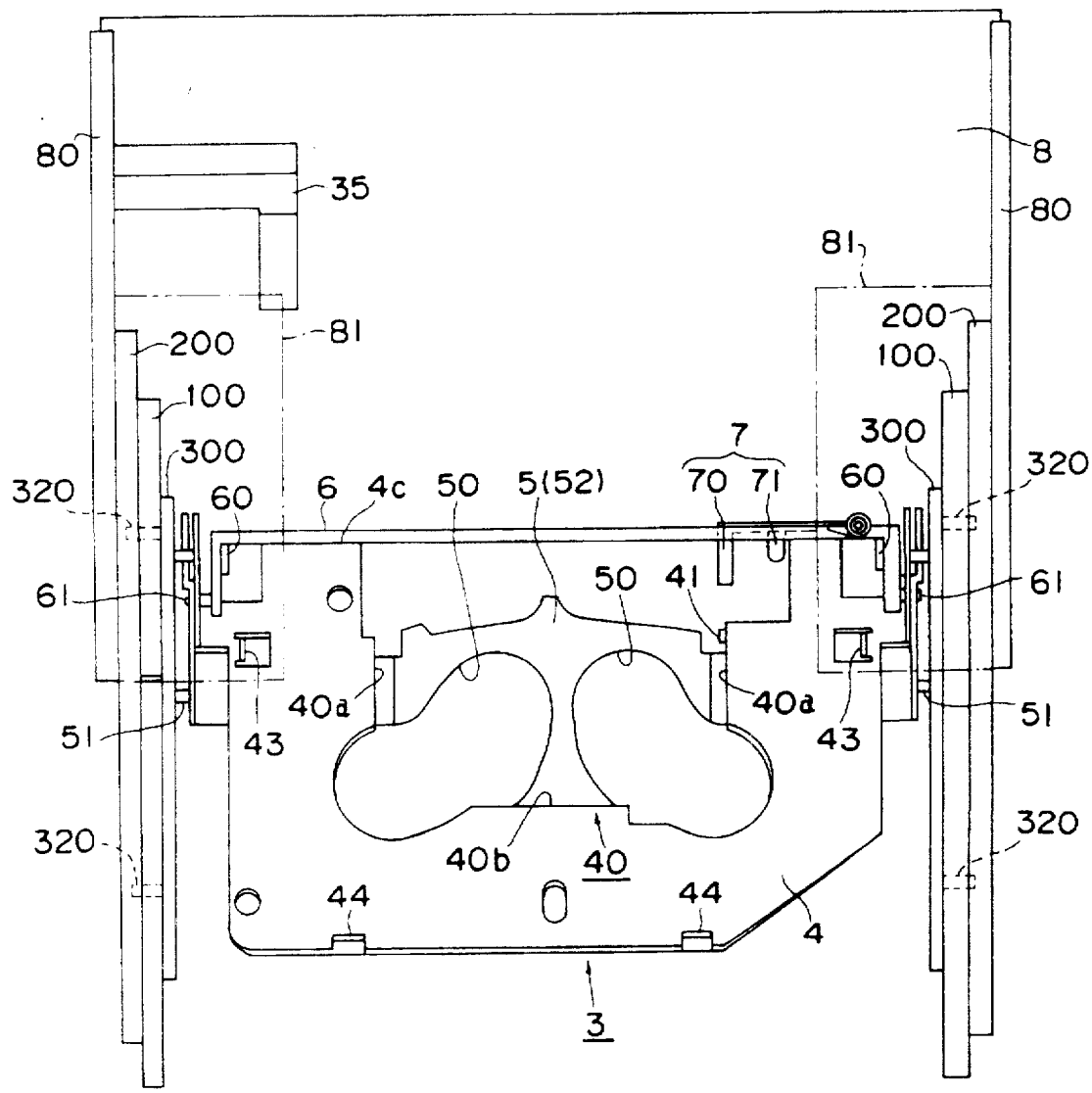
FIG. 1 is a plan view of a cassette loading device included in a magnetic recording-playback apparatus.

FIG. 1 is a plan view of a cassette loading device incorporated in the magnetic recording-playback apparatus. The cassette loading device has a pair of side plates 80, 80 on a chassis 8. Arranged inwardly of each side plate 80 are a subslide 200, main slide 100 and slide plate 300 which are slidable toward the front and rear.

Figure 8:
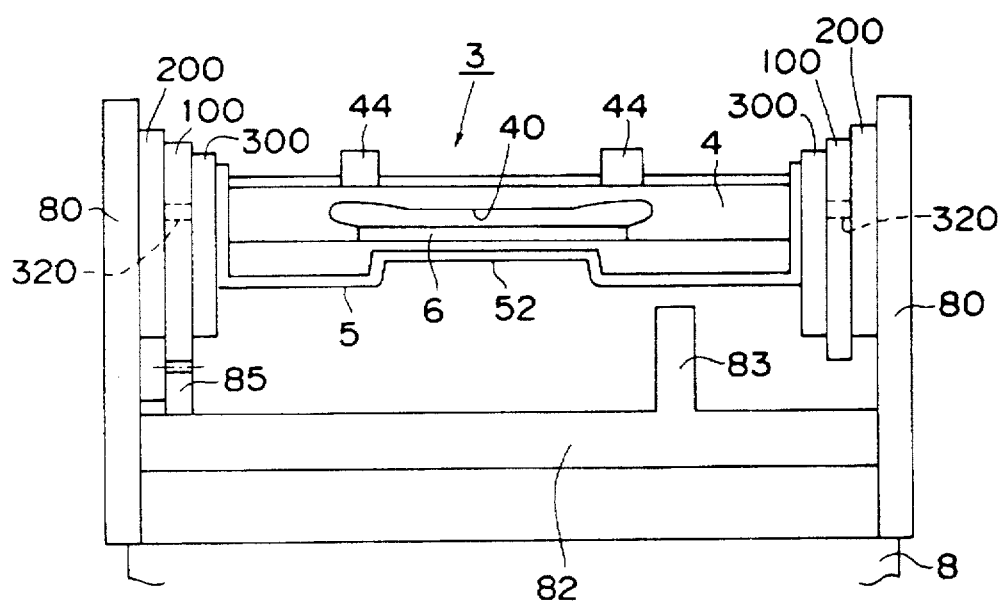
FIG. 8 is a front view of the cassette loading device.

The subslide 200 and the main slide 100 are covered with a top plate 81 projecting inward from the upper end of the slide plate 80. The opposite side plates 80, 80 are interconnected by a connecting bar 82 under the path of travel of the composite tray 3 as seen in FIG. 8. The composite tray 3 for supporting the large and small cassettes 1, 2 thereon is provided between the pair of slide plates 300, 300 shown in FIG. 1. The slide plates 300, subslides 200 and main slides 100 are adapted to slidingly move the composite tray 3. The composite tray 3 is horizontally driven and then lowered by these members to load the cassette in position.

The construction of the composite tray 3 will be described below first.

Figure 2:
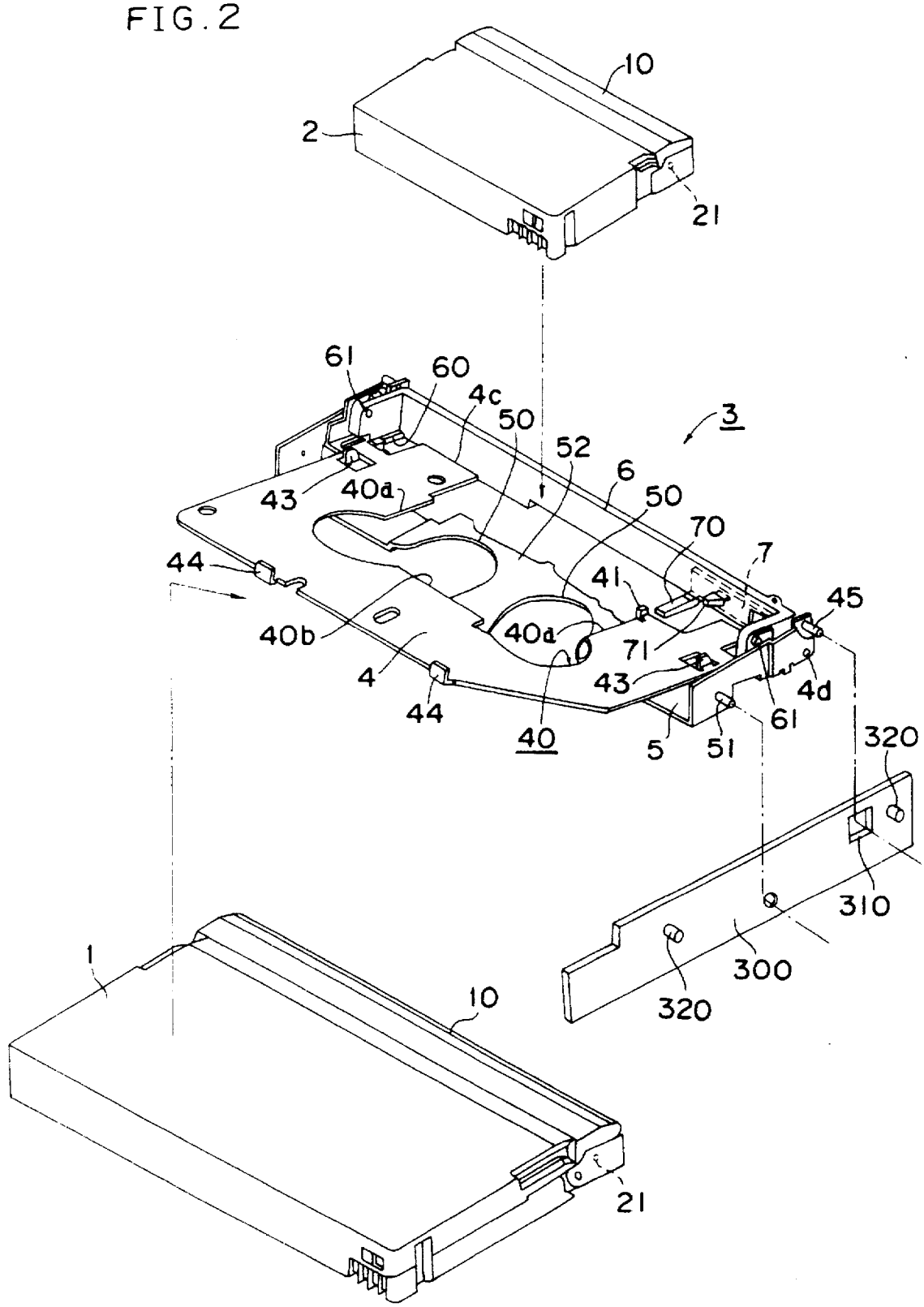
FIG. 2 is an overall perspective view of a composite tray.
Figure 5:
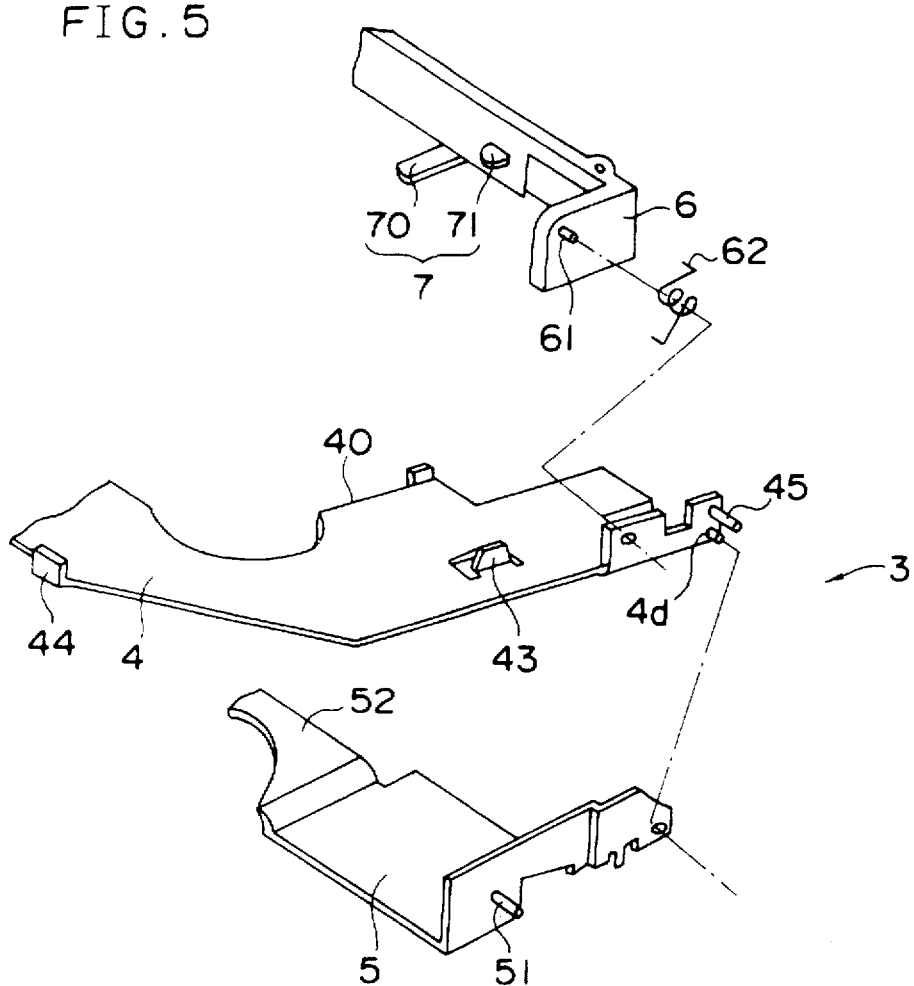
FIG. 5 is an exploded fragmentary perspective view of the composite tray.

FIG. 2 is a perspective view of the composite tray 3, and FIG. 5 is an exploded fragmentary view of the tray. The composite tray 3 comprises the large cassette tray 4 pivoted to inside portions of the small cassette tray 5, and the first lid opener 6 pivoted at 61 to front-end inside portions of the large cassette tray 4 for opening the lid 10 of the large cassette 1. The arrangement wherein the large cassette tray 4 is pivotally supported inside the small cassette tray 5 is disclosed in JP-A-76045/1991 and already known.

A pivot 4d projecting from each side wall of the large cassette tray 4 extends through the side wall of the small cassette tray 5, whereby the tray 4 is supported on the tray 5. A torsion spring (not shown) is fitted around the pivot 4d, biasing the large cassette tray 4 upward at all times. The tray 4 is thus biased upward and tilted to make the large cassette 1 easy to insert into the composite tray 3. A stopper mechanism for the large cassette tray 4 against the upward spring force will be described later.

The large cassette tray 4 is formed with a cutout 40 greater than the contour of the small cassette 2. The small cassette 2 as inserted in the cutout 40 is positioned in place by edges 40a, 40a, 40b defining the cutout 40. Projecting at a right end portion of the cutout 40 is an unlocking piece 41 for unlocking the first lid 10 of the small cassette 2. The small cassette tray 5 has at its center a raised wall 52 for supporting the bottom of the small cassette 2 thereon. The raised wall 52 is fittable in the cutout 40.

Figure 6:
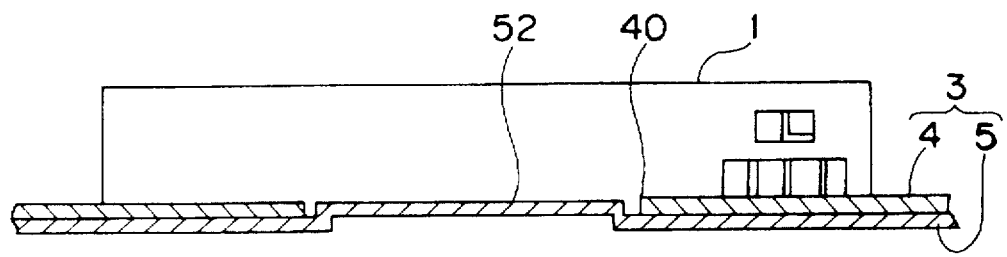
FIG. 6 is a view in section of FIG. 4 as the device is seen in the direction of arrow B.

When the large cassette 1 is placed on the tray 4, the weight of the cassette 1 pivotally moves the tray 4 downward. The bottom surface of the large cassette tray 4 comes into contact with the upper surface of the small cassette tray 5, and the upper surface of the raised wall 52 passing through the cutout 40 is positioned in the same plane as the upper surface of the large cassette tray 4 (see FIG. 6).

The small cassette tray 5 is also formed with cutouts 50, 50. Reel supports extend through the respective cutouts 50 and the cutout 40 to fit into the cassette 1 or 2.

The large cassette tray 4 has unlocking pawls 43, 43 at opposite side portions thereof for unlocking the lid 10 of the large cassette 1, and bent lugs 44, 44 at rear end portions thereof for positioning the large cassette 1 in place by contact with the rear end face of the cassette 1.

The first lid opener 6 is formed at a lower portion of each of its opposite ends with a bearing face 60 for the large cassette 1, is biased downward by a torsion spring 62 (see FIG. 5) fitting around the pivot 61, and has a lower end in contact with the front end 4c of support wall of the large cassette tray 4. Since the tray 4 is tilted relative to the small cassette tray 5 in the absence of the large cassette 1 as previously stated, the first lid opener 6 is also tilted with respect of the tray 5.

Figure 9:
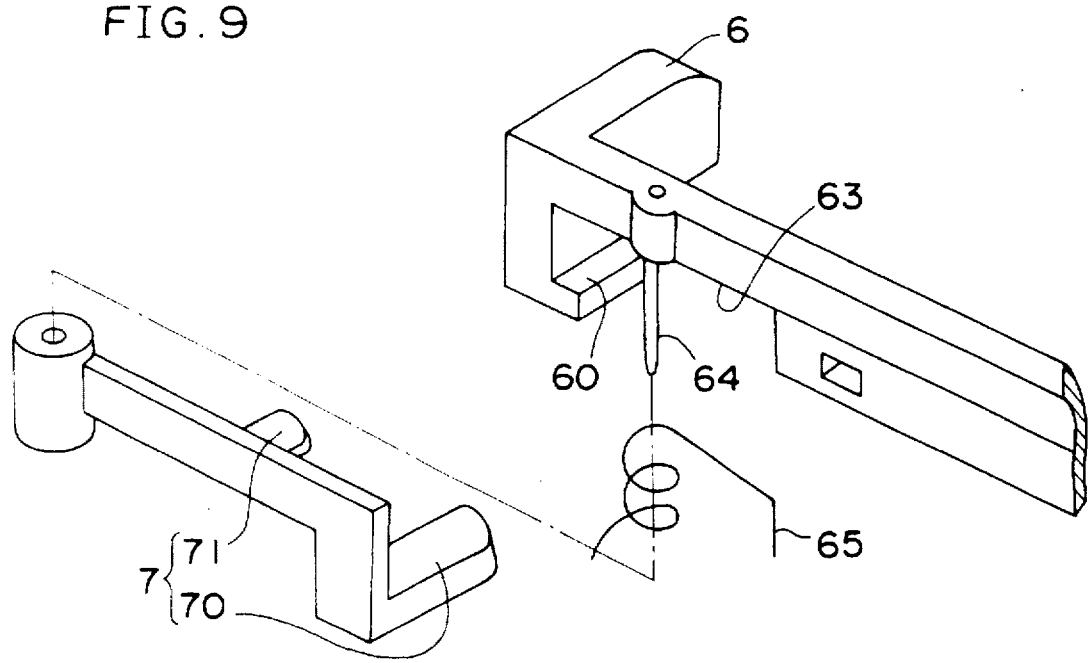
FIG. 9 is an exploded perspective view of a second lid opener.

With reference to FIG. 2, at the right side of the small cassette supporting position, the second lid opener 7 for opening the first lid 10 of the small cassette 2 is pivotally supported by the first lid opener 6. The opener 7 is pivotally movable in a plane parallel to the support wall of the large cassette tray 4. The second lid opener 7 for opening the first lid 10 of the small cassette 2 is fitted to a shaft 64 carrying a torsion spring 65 and extending downward from the upper side of a cutout portion 63 of the first lid opener 6 as shown in FIG. 9, and is biased toward the small cassette supporting region. The second lid opener 7 is provided at a free end thereof with a contact piece 70 adapted to contact the bottom surface of the small cassette 2 and with a kickout piece 71 adapted to contact the first lid 10 of the large cassette 1 when the large cassette 1 is inserted.

With the small cassette 1 supported in position, the contact piece 70 has its upper face positioned at a lower level than the lower face of the first lid opener 6 (see FIG. 11). As will be described later, the kickout piece 71 is pushed by the first lid 10 of the large cassette 1 when the cassette 1 is placed on the tray 4 to force out the second lid opener 7 to the outside of the composite tray 3.

As shown in FIG. 1, a stand piece 35 is positioned to the front of the composite tray 3 and attached to the inner side of the left side plate 80 for opening the first lid opener 6 by contact therewith, with the sliding movement of the tray 3.

Figure 7:
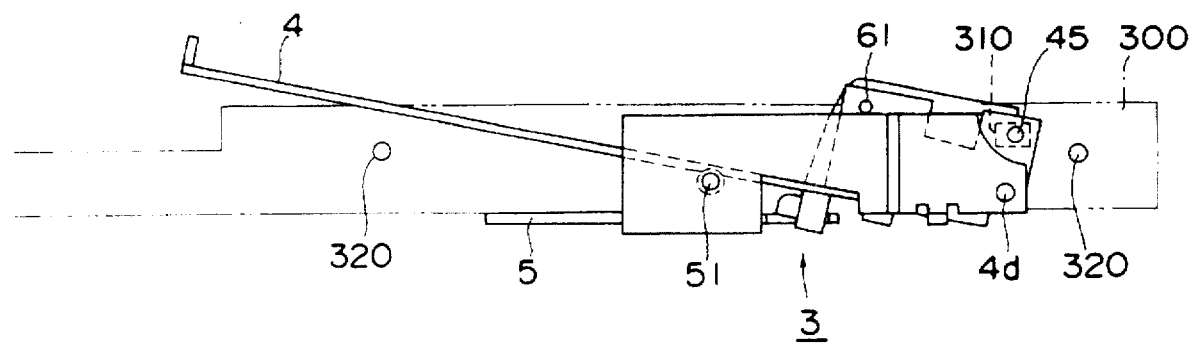
FIG. 7 is a right side elevation of the composite tray.

FIGS. 2 and 5 show a first pin 51 projecting from a rear end portion of side wall of the small cassette tray 5, and a second pin 45 projecting from a front end portion of side wall of the large cassette tray 4. As seen in FIGS. 2 and 7, the pins 51, 45 fit in the slide plate 300 attached to these side walls of the composite tray 3. For convenience of description, FIG. 2 shows only the slide plate 300 attached to the right side of the tray 3. Since the large cassette tray 4 is pivotally movable about the pivot 4d as previously stated, an aperture 310 of the slide plate 300 receiving the second pin 45 has a tolerance corresponding to the movable range of the second pin 45. The tray 4 is upwardly biased as already stated, holding the second pin 45 in contact with the upper edge of the aperture portion 310 as seen in FIG. 7. The aperture portion 310 therefore serves as a stopper against the pivotal movement of the tray 4.

Figure 12:
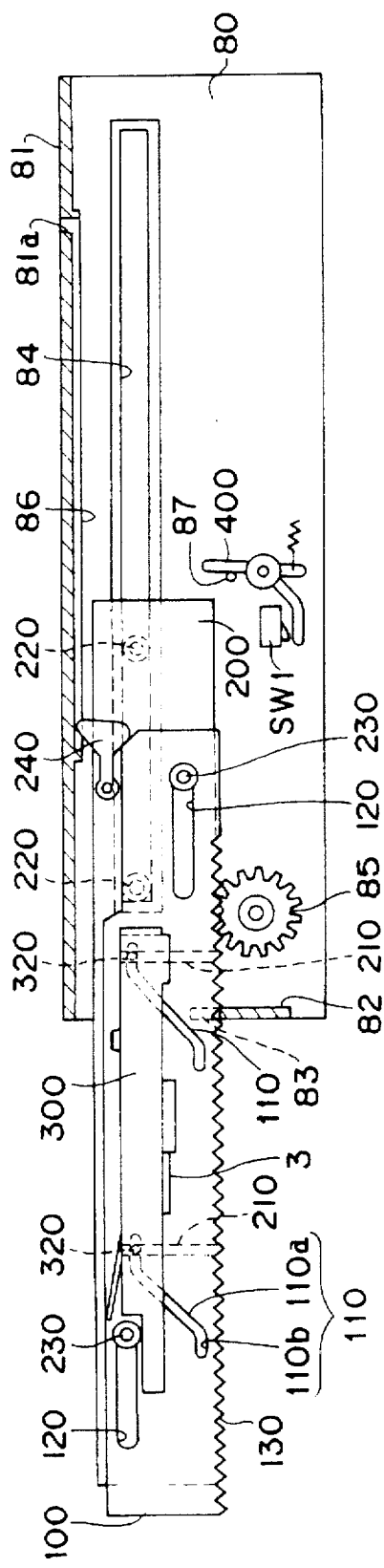
FIG. 12 is a right side elevation showing the composite tray as withdrawn with a right side plate omitted.
Figure 13:
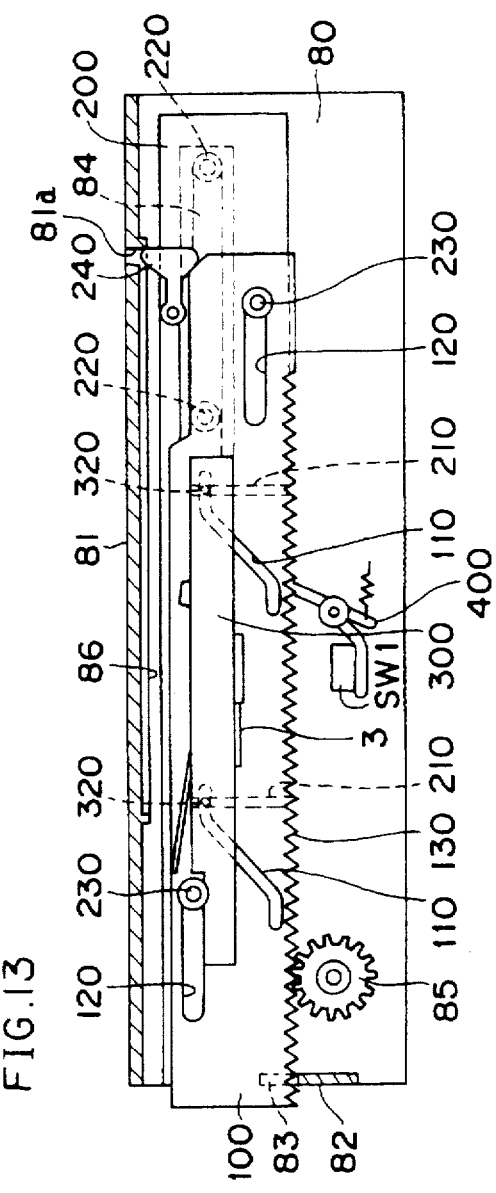
FIG. 13 is a right side elevation showing the composite tray as completely transported horizontally with the right side plate omitted.
Figure 14:
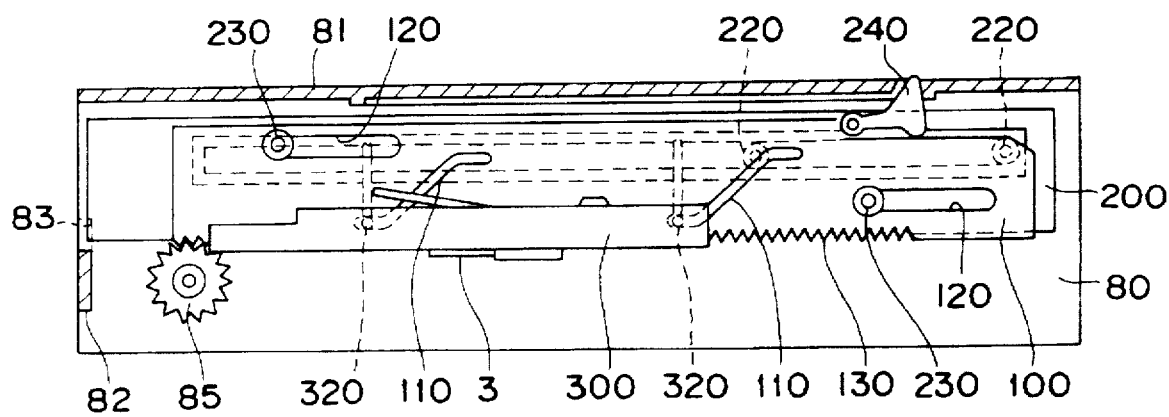
FIG. 14 is a right side elevation showing the composite tray as completely lowered with the right side plate omitted.

The slide plate 300 has slide pins 320, 320 projecting respectively from front and rear end portions thereof. FIGS. 12 to 14 are side elevations showing the cassette loading device with the side plate 80, subslide 200 and main slide 100 removed from its right side and with the top plate 81 partly broken away. The slide pins 320, 320 extend through respective cam grooves 110, 110 formed in the inner surface of the main slide 100 and fit in respective vertical slots 210, 210 formed in the subside 200. Each of the cam grooves 110 has a slanting groove portion a inclined with respect to the sliding direction of the composite tray 3, and horizontal groove portions 110b, 110b extending from the respective ends of the groove portion 110a.

The subslide 200 carries two rollers 220, 220 projecting outward therefrom and fitting in a guide groove 84 in the side plate 80, and is slidable forward and rearward. Inwardly projecting from the subslide 200 are front and rear two guide pins 230, 230 fitting in respective slots 120, 120 in the main slide 100. A lock lever 240 biased clockwise by a spring is mounted on an upper end portion of the subslide 200. The lock lever 240 has one end fitting in a guide groove 86 in the side plate 80 and is slidable with the subslide 200. The lock lever 240 is in bearing contact with the front end of the main slide 100. When the main slide 100 moves forward, the lock lever 240 causes the subslide 200 also to move forward. The main slide 100 is formed at its lower end with a rack 130, which is in mesh with a pinion 85 attached to the inner side of the side plate 80. The pinion 85 is driven by a motor (not shown).

Disposed in front of the subslide 200 is a switch actuating lever 400 biased counterclockwise by a spring. The lever 400 is in contact with a stopper 87 projecting from the side plate 80. A switch SW is disposed in the path of rotation of the lever 400. The motor is energized to rotate the pinion 85 when the switch SW is turned on by being pushed by the lever 400.

[Cassette Loading Operation]

Figure 3:
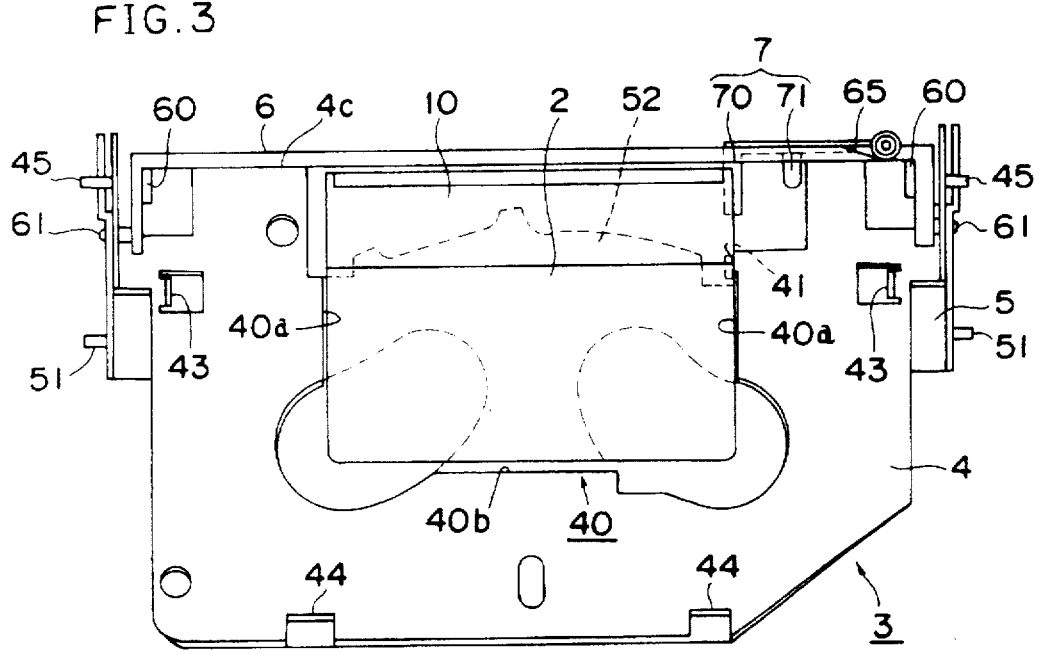
FIG. 3 is a plan view of the cassette loading device with a small cassette place therein.

To position the small cassette 2 in place on the composite tray 3, the cassette 2 is inserted through the cutout 40 of the large cassette tray 4 and placed onto the raised wall 52 of the tray 5 as shown in FIG. 3. The insertion of the small cassette 2 causes the unlocking piece 41 on the tray 4 to rotate the lock piece 20 (see FIG. 24) to unlock the first lid 10. At this time, the contact piece 70 of the second lid opener 7 is opposed to the bottom surface of the small cassette 2 (see FIGS. 3 and 11(a)).

Figure 4:
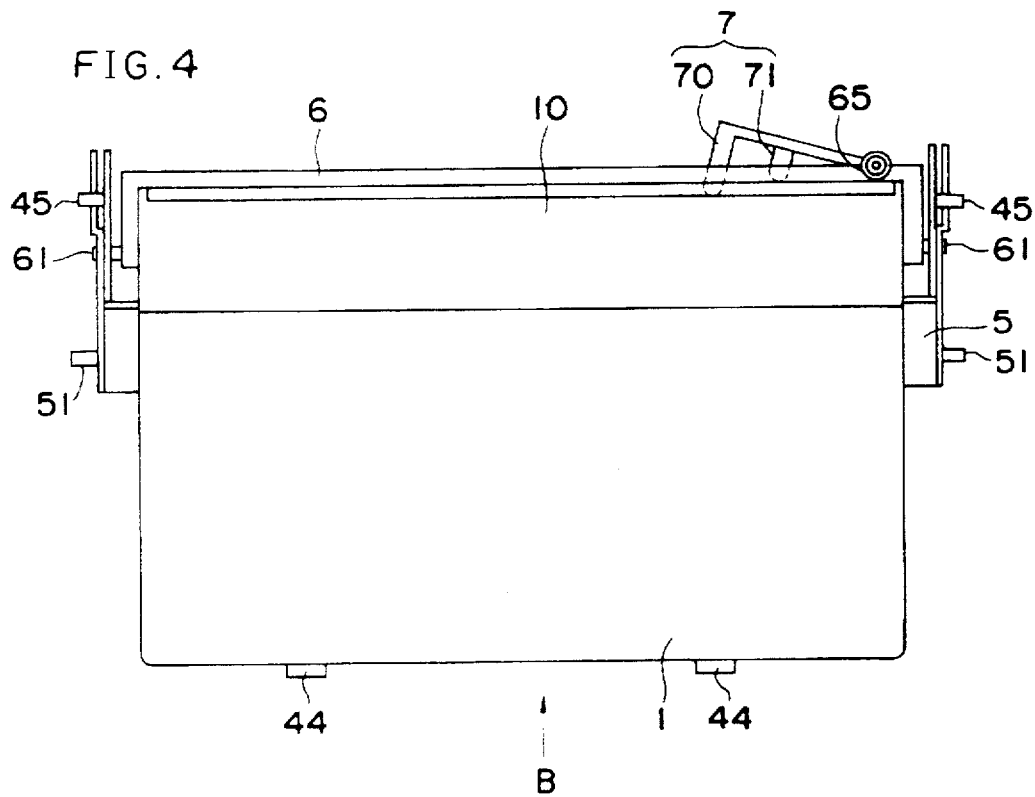
FIG. 4 is a plan view of the cassette loading device with a large cassette placed therein.

The large cassette 1 is placed on the composite tray 3 by inserting the large tray 1 into the large cassette tray 4 obliquely from behind as shown in FIG. 2. At this time, the first lid 10 of the large cassette 1 pushes the kickout piece 71 of the second lid opener 7, rotating the opener 7 clockwise against the torsion spring 65 as shown in FIG. 4 The second rid opener 7 escapes from the large cassette supporting position for the reason to be described later.

Further the insertion of the large cassette 1 causes the unlocking pieces 43, 43 on the large cassette tray 4 shown in FIG. 2 to rotate the lock pieces 20, unlocking the first lid 10 and rendering the lid 10 openable. The tray 4 is rotated by the weight of the large cassette 1 as previously stated and held in a horizontal position in contact with the small cassette tray 5. At this time, the center 14 about which the first lid 10 pivotally moves coincides with the pivot 61 which is the center of rotation of the first lid opener 6 when seen from one side (see FIG. 10(a)).

The main slide 100 shown in FIG. 12 is manually pushed rightward with the cassette 1 or 2 supported on the tray. The subslide 200 is held in engagement with the main slide 100 by the lock lever 240 and is therefore also slidingly moved rightward. The subslide 200 rotates the switch actuating lever 400 clockwise to push the switch SW1, whereupon energization of the motor rotates the pinion 85, driving the subslide 200 and the main slide 100 forward. The composite tray 3 coupled to the slide 300 engaged in the vertical slots 210, 210 of the subslide 200 also slidingly moves forward.

Figure 10A:
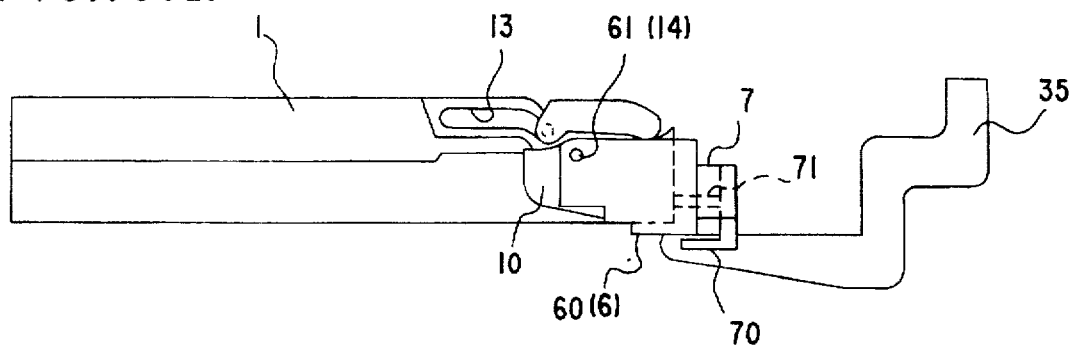
FIG. 10(a) is a side elevation showing a stand piece as opposed to the lower surface of the large cassette.
Figure 11A:
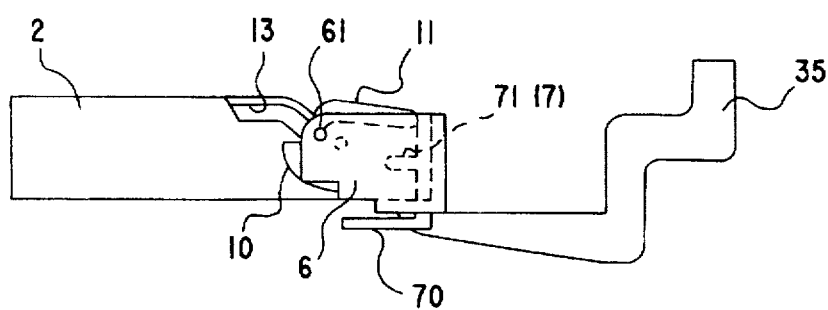
FIG. 11(a) is a side elevation showing the stand piece as opposed to the lower surface of the small cassette.

With reference to FIG. 13, the lock lever 240 fits into a hole 81a formed in the top plate 81 at the terminal end of the guide groove 86 on completion of the horizontal sliding movement of the slides 100, 200, whereby the subslide 200 is prevented from moving forward. In this state, the stand piece 35 projecting from the side plate 80 comes into contact with the lower surface of the first lid opener 6 as seen in FIGS. 10(a) and 11(a).

The pinion 85 further rotates, causing the main slide 100 only to advance since the subslide 200 is restrained from moving forward. The slide plate 300 and the composite tray 3 descend along the cam grooves 110 of the main slide 100 to a cassette loading position as seen in FIG. 14.

[Lid Opening Operation]

With the descent of the composite tray 3, the stand piece 35 (see FIG. 1) attached to the left side plate 80 opens the first lid opener 6.

Figure 11B:
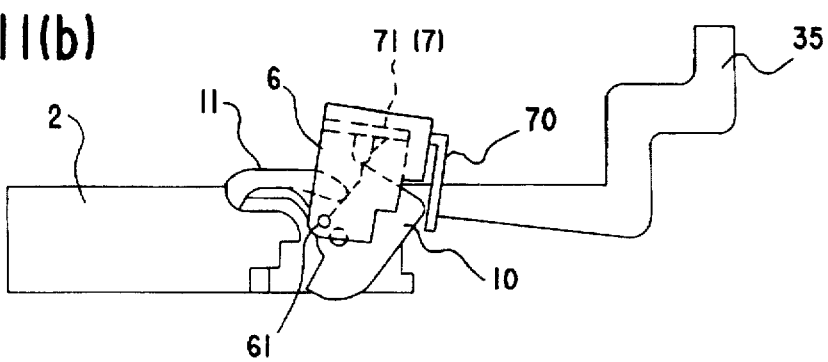
FIG. 11(b) is a side elevation showing the small cassette while the lid thereof is being opened.

With the small cassette 2, the stand piece 35 rotates the first lid opener 6, similarly rotating also the second lid opener 7 attached to the opener 6 as shown in FIG. 11(b). The contact piece 70 of the second opener 7 opens the first lid 10 by rotation.

Figure 10B:
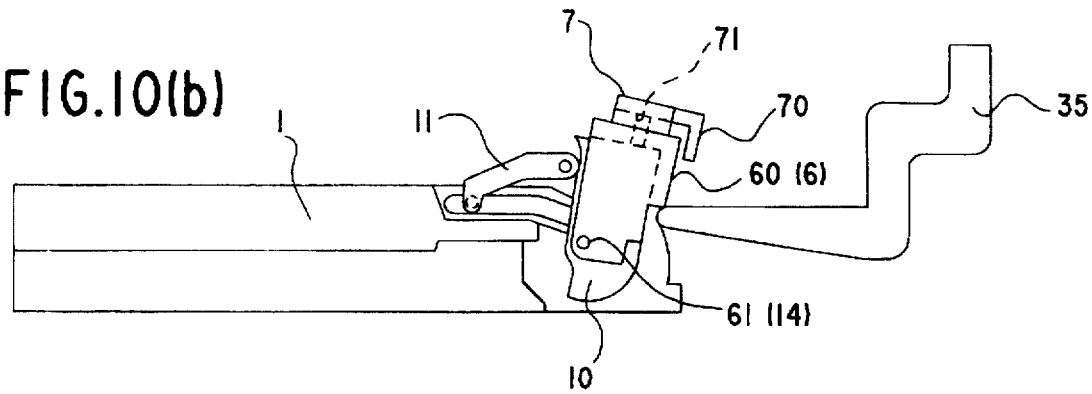
FIG. 10(b) is a slide elevation showing the large cassette while the lid thereof is being opened.

With the large cassette 1, the stand piece 35 rotates the first lid opener 6, whereby the first lid 10 resting on the bearing faces 60 of the opener 6 is opened as shown in FIG. 10(b). With the second lid opener 7 already moved out from the large cassette supporting position, the tape in the large cassette 1 is unlikely to become caught by the second lid opener 7 at this time. More specifically, the contact piece 70 of the second lid opener 7 is positioned at a lower level than the lower end of the first lid opener 6 when the large cassette 1 is supported on its tray 4. This eliminates the likelihood that the contact piece 70, if located in the large cassette supporting position, would engage with the tape in the large cassette 1 while the first lid 10 is being opened by the first lid opener 6.

The first lids 10 of the cassettes 1, 2 are opened by the first and second openers 6, 7, respectively, in order to obviate the problem that the lid 10 would be defaced if the stand piece 35 is brought into direct contact with the first lid 10 to open the lid 10.

[Altered Mechanism for Unlocking the Small Cassette]

The applicant has found the problem that while the small cassette 2 is repeatedly loaded onto and unloaded from the composite tray 3, the first lid 10 of the small cassette 2 is not always unlocked smoothly. To unlock the first lid 10, the lock piece 20 shown in FIG. 24 needs to be moved clockwise about the pivot 21.

In the case of the large cassette 1, the first lid 10 can be unlocked by inserting the cassette 1 into the composite tray 3 of FIG. 2 obliquely from behind, bringing the lock piece 20 into contact with the unlocking claw 43 and thereby rotating the lock piece 20. However, the small cassette 2, which is to be placed onto the tray 5 through the cutout 40 of the tray 4, must be inserted from immediately thereabove, so that if the cassette 2 is inserted with its front end tilted downward, it is very likely that the lid 10 will not be unlocked. The applicant has contrived the following mechanism to reliably unlock the first lid 10.

FIG. 15 is a perspective view of a composite tray 3 having a mechanism for unlocking the first lid 10 of the small cassette 2. At the right side of the cutout 40 of the large cassette 4, an unlocking slide 9 is disposed which has a release claw 90 projecting into the cutout 40 and which extends along the rear surface of the tray 4.

The release claw 90 projects upward from a stepped portion 91 extending downward from the slide 9, and has an upper end positioned slightly below the upper surface of the tray 4. The unlocking slide 9 is formed with slots 92, 92 extending in the front-to-rear direction and having engaged therein respective projections 47, 47 on the rear surface of the tray 4. The slide 9 is thus made slidable forward and rearward, and biased rearward by a torsion spring 46.

Figure 16:
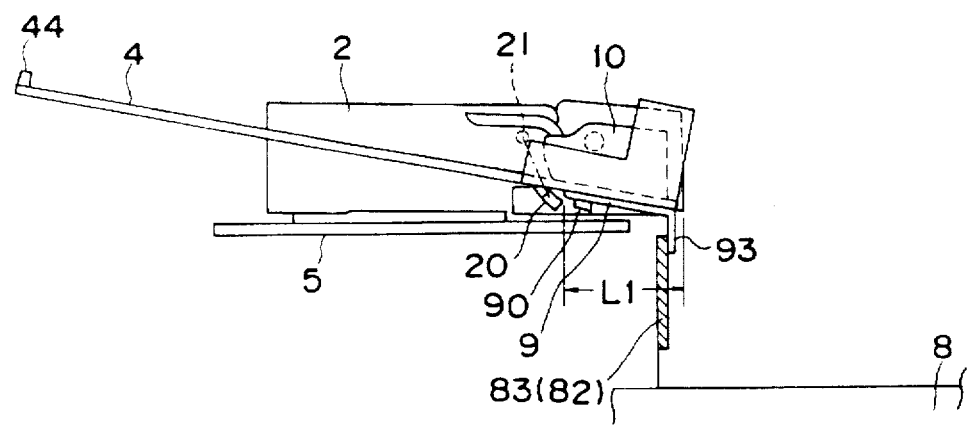
FIG. 16 is a side elevation of the same to show the position of a large cassette tray and a small cassette tray relative to each other.
Figure 18A:
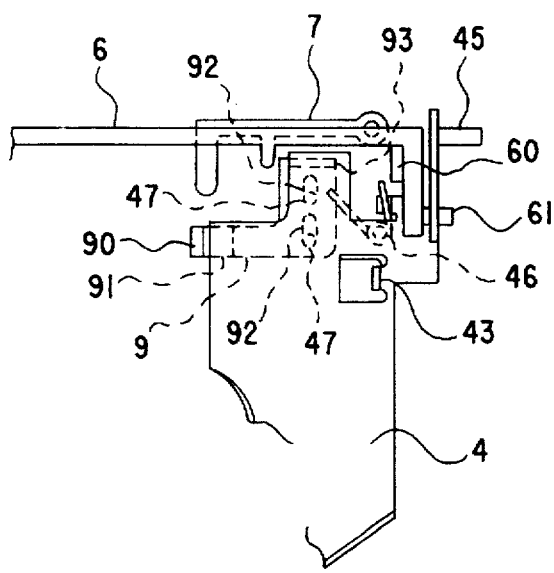
FIG. 18(a) is a plan view of the unlocking slide in a standby position.

FIG. 16 is a side elevation showing the composite tray 3 in section. The arrangement for pivotally supporting the large and small cassette trays 4, 5 is the same as the one shown in FIG. 7 and will not be described repeatedly. A restraining projection 83 extends upward from the connecting bar 82 interconnecting the side plates 80, 80 (see FIG. 8). Before the small cassette is advanced for loading, an engaging piece 93 extending downward from the front end of the unlocking slide 9 is in engagement with the restraining projection 83. In this state, the rear edges of the slotted portions 92 are in contact with the respective projections 47 against the torsion spring 46 (see FIG. 18(a)). The lower end of the lock piece 20 is at a distance of L1 from the front end of the first lid 10, and the release claw 90 is opposed to the lower end of the lock piece 20.

Figure 17:
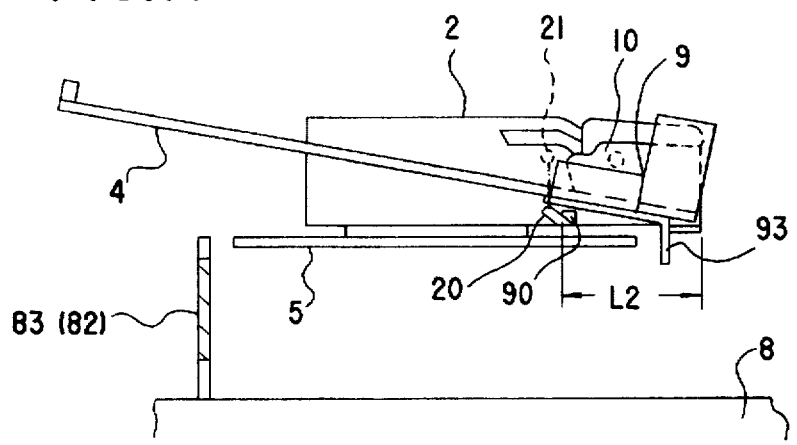
FIG. 17 is a side elevation showing the lid of the small cassette as unlocked by the unlocking slide.
Figure 18B:
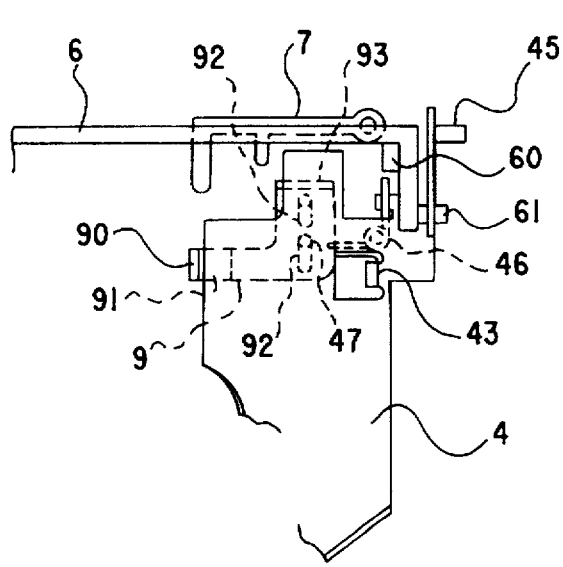
FIG. 18(b) is a plan view of the unlocking slide as slidingly moved in a lid unlocking direction.
Figure 19:
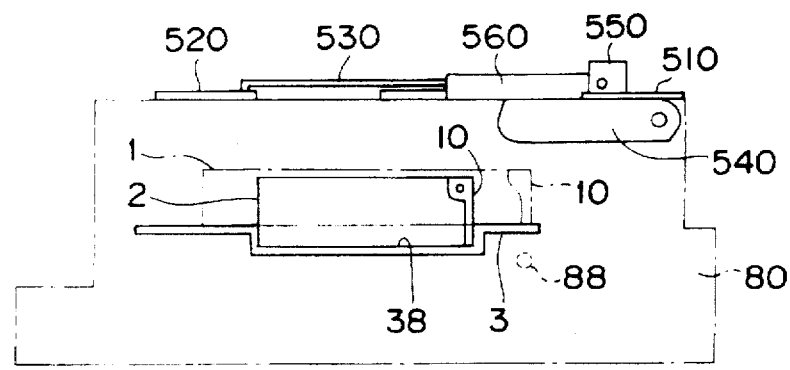
FIG. 19 is a side elevation of a conventional cassette loading device.
Figure 20:
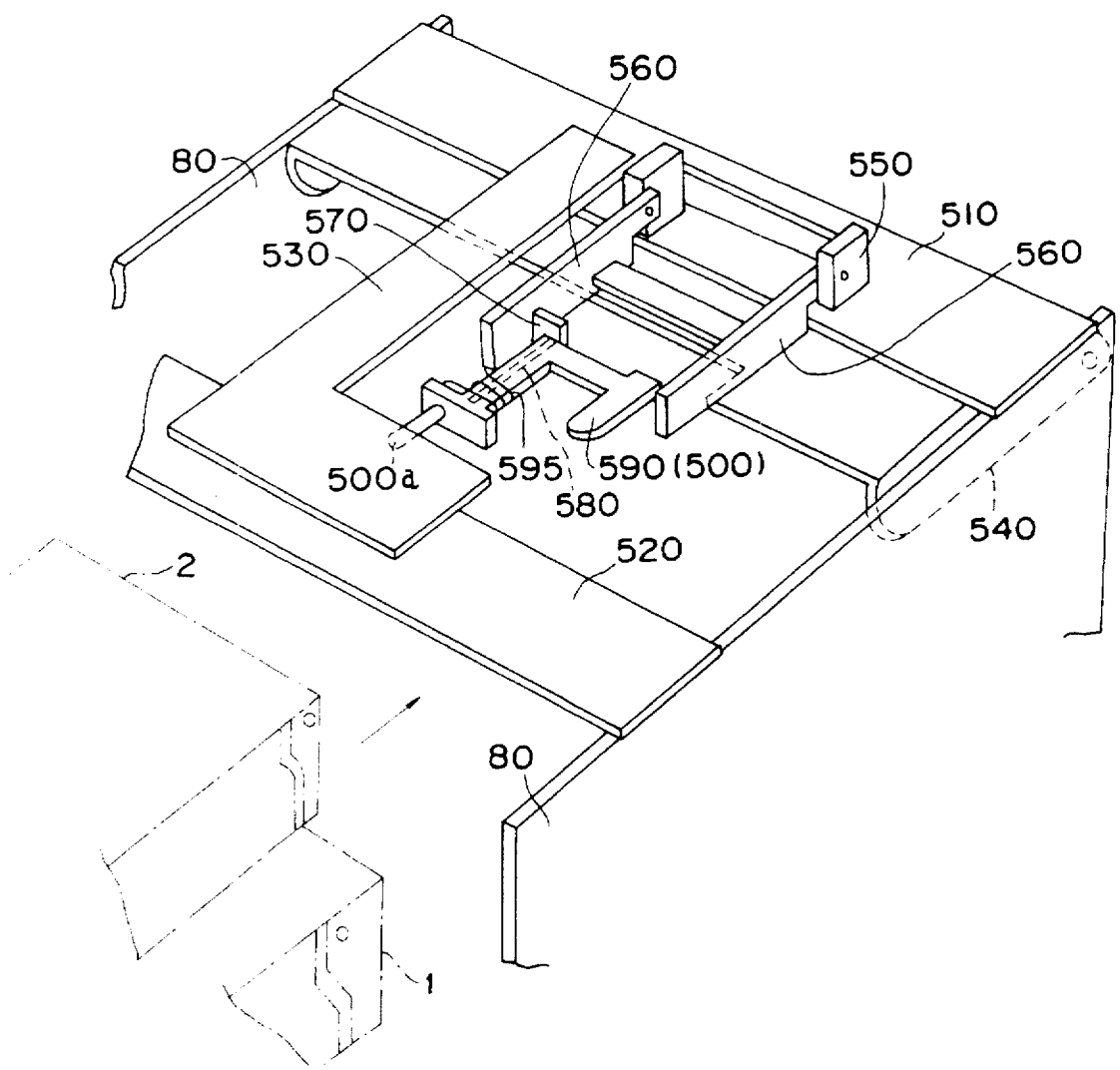
FIG. 20 is an enlarged fragmentary perspective view of the device of FIG. 19.
Figure 21:
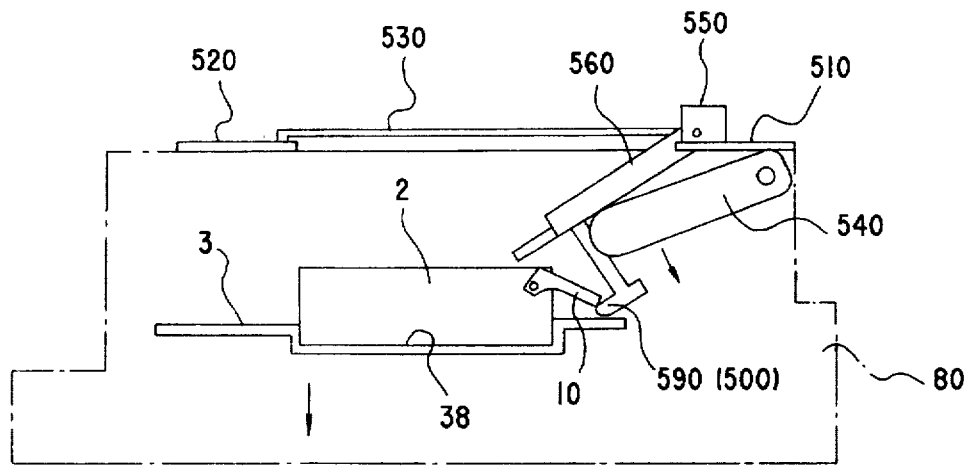
FIG. 21 is a side elevation of the device of FIG. 19 to show a tray as completely lowered.
Figure 22A:
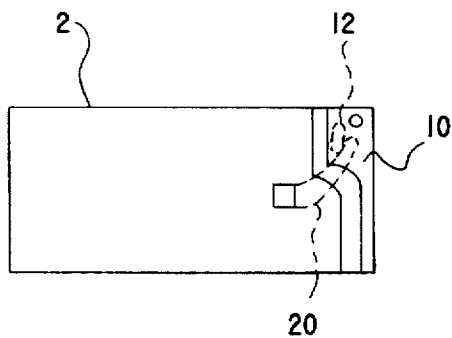
FIG. 22(a) is a right side elevation of a small cassette.
Figure 22B:
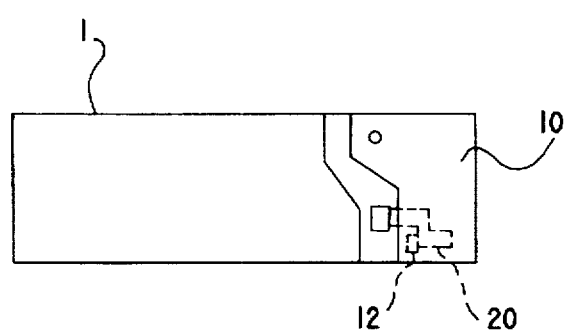
FIG. 22(b) is a right side elevation of a large cassette.
Figure 23:
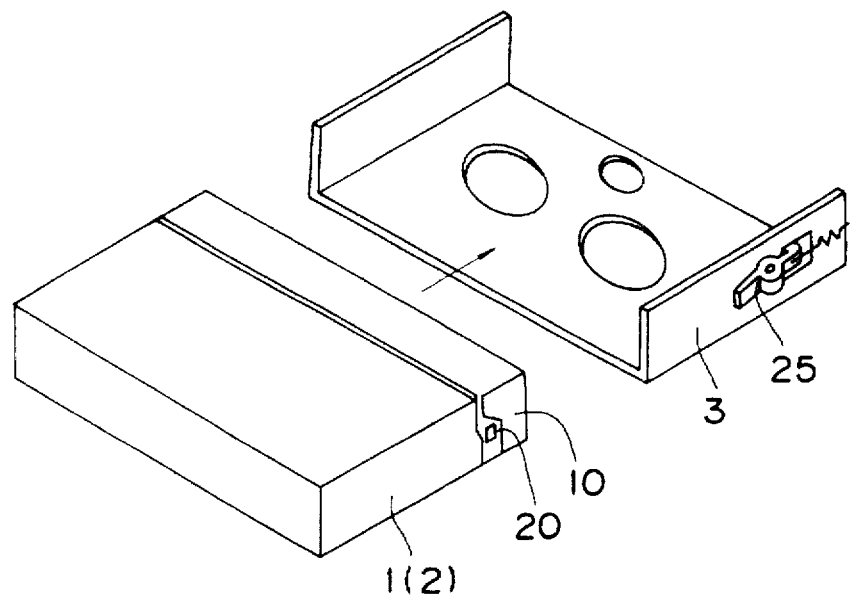
FIG. 23 is a perspective view of the tray and the cassette.

When the composite tray 3 is advanced for loading, the engaging piece 93 of the unlocking slide 9 is disengaged from the restraining projection 83, allowing the slide 9 to move rearward along the rear surface of the tray 4 under the action of the torsion spring 46 as seen in FIG. 18(b). As seen in FIG. 17, the release claw 90 of the unlocking slide 9 comes into contact with the lower end of the lock piece 20 of the small cassette 2, pivotally moving the lock piece 20 clockwise. At this time, the distance from the lower end of the lock piece 20 to the front end of the first lid 10 is L2. Thus, the slide 9 moves a distance of L2–L1. The lid 10 of the cassette 2 is unlocked and made openable.

Accordingly, the unlocking slide 9 slidingly moves during the cassette loading operation to unlock the first lid 10 in whatever posture the small cassette 2 may be placed onto the composite tray.

For unloading, the components of the loading device operate reversely to the foregoing operation, and a detailed description will not be given therefore.

What is claimed is:

1. A magnetic recording-playback apparatus for use with two kinds of cassettes different in size which apparatus comprises a tray for supporting thereon either one of large and small cassettes each having a magnetic recording-playback tape enclosed therein and a lid openably pivoted to a front side of the cassette, and a lid opener for opening the lid by lifting, the apparatus being characterized in that:

the tray comprises a small cassette tray for supporting the small cassette thereon, and a large cassette tray pivoted to inside portions of the tray for supporting the large cassette thereon, the lid opener comprising a first lid opener pivoted to the large cassette tray, having a bearing face for supporting a lower face of the lid of the large cassette in contact therewith and rotatable with a cassette loading movement for pushing the lid of the large cassette open, and a second lid opener pivoted to the first lid opener, pivotally movable in a plane parallel to a bottom surface of the large cassette and having a contact piece adapted to contact a lower faceof the lid of the small cassette, for pushing the lid of the small cassette open with the rotation of the first lid opener, the contact piece being positioned at a lower level than the bearing face, the second lid opener having a kickout piece projecting toward the lid of the large cassette as located in its supported position, the kickout piece being positioned in a large cassette supporting region when the large cassette is not supported on the tray, the kickout piece being pushable by the lid of the large cassette when the large cassette is supported on the tray to force the entire second lid opener to the outside of the large cassette tray.

2. A magnetic recording-playback apparatus as defined in claim 1 wherein the large cassette tray is tilted by being biased upward about the pivot relative to the small cassette tray, the small cassette tray having a raised wall for placing the small cassette thereon, the large cassette tray having a cutout for fitting the raised wall therein, the small cassette being placeable on the raised wall through the cutout of the large cassette tray and positionable in place by an edge defining the cutout, the large cassette tray being provided with bent lugs for positioning the large cassette in place by contact with a rear end face of the large cassette.

3. A magnetic recording-playback apparatus as defined in claim 2 wherein the large cassette tray is upwardly biased lightly so as to be lowered by the weight of the large cassette supported on the tray, and the bottom surface of the large cassette, when in a completely lowered position, is positioned in the same plane as an upper surface of the raised wall.

4. A magnetic recording-playback apparatus for use with two kinds of cassettes different in size which apparatus comprises a tray for supporting thereon either one of large and small cassettes each having a lid pivoted to a front side of the cassette and a lock piece on a side wall thereof for preventing the lid from opening inadvertently, the tray comprising a small cassette tray and a large cassette tray pivoted to inside portions of the tray, and being slidably provided between a pair of side plates, the apparatus being characterized in that:

the tray is disposed above a connecting bar interconnecting the pair of side plates, the large cassette tray being slidably provided with an unlocking slide biased in a direction to release the lock piece, the unlocking slide being provided with an engaging piece in engagement with a restraining projection on the connecting bar when the small cassette is not loaded, and a release claw movable into contact with the lock piece of the small cassette to move the lock piece in an unlocking direction, with the engaging piece disengaged from the restraining projection by the loading movement of the tray.

5. A magnetic recording-playback apparatus as defined in claim 4 wherein the small cassette tray has a raised wall for supporting the small cassette thereon, the large cassette tray having a cutout for fitting the raised wall therein, the small cassette being placeable on the raised wall through the cutout, the unlocking slide being disposed beneath a rear surface of the large cassette tray outwardly of the cutout, the release claw to be contacted with the lock piece projecting from the unlocking slide and being positioned in the cutout.

* * * * *